United States Patent
Henriksson et al.

(10) Patent No.: US 11,377,329 B2
(45) Date of Patent: Jul. 5, 2022

(54) SENSOR TROLLEY AND CORRESPONDING CONTAINER CRANE

(71) Applicant: ABB Schweiz AG, Baden (CH)

(72) Inventors: Björn Henriksson, Västerås (SE); Uno Bryfors, Västerås (SE)

(73) Assignee: ABB Schweiz AG, Baden (CH)

( * ) Notice: Subject to any disclaimer, the term of this patent is extended or adjusted under 35 U.S.C. 154(b) by 131 days.

(21) Appl. No.: 16/800,388

(22) Filed: Feb. 25, 2020

(65) Prior Publication Data
US 2020/0270105 A1  Aug. 27, 2020

(30) Foreign Application Priority Data
Feb. 25, 2019  (EP) .................................... 19158980

(51) Int. Cl.
| | | |
|---|---|---|
| *B66C 13/46* | (2006.01) | |
| *B66C 13/16* | (2006.01) | |
| *B66C 19/00* | (2006.01) | |
| *G06V 20/64* | (2022.01) | |

(52) U.S. Cl.
CPC .............. *B66C 13/46* (2013.01); *B66C 13/16* (2013.01); *B66C 19/007* (2013.01); *G06V 20/64* (2022.01)

(58) Field of Classification Search
CPC ..... B66C 19/00; B66C 19/002; B66C 19/007; B66C 11/04; B66C 13/22; G06K 9/00201
See application file for complete search history.

(56) References Cited

U.S. PATENT DOCUMENTS

| | | | |
|---|---|---|---|
| 5,951,226 A | * | 9/1999 | Fantuzzi ............... B65G 63/004 414/141.3 |
| 7,950,539 B2 | | 5/2011 | Henriksson |
| 9,260,276 B2 | * | 2/2016 | Stocker .................. B66C 19/002 |
| 2005/0281644 A1 | * | 12/2005 | Lussen ................... B66C 13/085 414/403 |
| 2006/0042397 A1 | * | 3/2006 | Kurita .................... G01V 5/0008 73/800 |
| 2011/0017693 A1 | * | 1/2011 | Thomas ................... B66C 13/16 212/270 |
| 2018/0050889 A1 | * | 2/2018 | Fakkeldij ............... B66C 19/007 |

FOREIGN PATENT DOCUMENTS

| | | |
|---|---|---|
| DE | 20220364 U1 | 6/2003 |
| DE | 102006044187 A1 | 4/2008 |
| EP | 1748335 A2 | 1/2007 |
| JP | 2000169078 A | 6/2000 |
| JP | 2004131198 A | 4/2004 |

(Continued)

OTHER PUBLICATIONS

Machine Translation JP 2000/169078A (Year: 2000).*

(Continued)

*Primary Examiner* — Michael R Mansen
*Assistant Examiner* — Juan J Campos, Jr.
(74) *Attorney, Agent, or Firm* — Whitmyer IP Group LLC

(57) ABSTRACT

It is provided a sensor trolley for use in a container crane. The sensor trolley includes: a sensor arrangement being usable to determine a position of a target for landing or picking up a container; and the sensor trolley is configured to be movable along a horizontal trolley support of the container crane for the sensor arrangement to cover a plurality of vehicle lanes under the container crane.

19 Claims, 4 Drawing Sheets

(56) References Cited

FOREIGN PATENT DOCUMENTS

| | | |
|---|---|---|
| KR | 1020080047347 | 5/2008 |
| KR | 1020130020682 | 2/2013 |
| WO | 2009052854 A1 | 4/2009 |

OTHER PUBLICATIONS

European Patent Office, Extended Search Report issued in corresponding Application No. 19158980.3, dated Sep. 26, 2019, 6 pp.
Korean Patent Office, Office Action issued in corresponding Application No. 10-2020-0019132, dated May 26, 2020, 5 pp.

* cited by examiner

SENSOR TROLLEY AND CORRESPONDING CONTAINER CRANE

TECHNICAL FIELD

The present disclosure relates to the field of container cranes and in particular to positioning of a target for landing or picking up a container.

BACKGROUND

Container cranes are used to handle freight containers, to transfer containers between transport modes at container terminals, freight harbours and the like. Standard shipping containers are used to transport a great and growing volume of freight around the world. Trans-shipment is a critical function in freight handling. Trans-shipment may occur at each point of transfer and there is usually a tremendous number of containers that must be unloaded, transferred to a temporary stack, and later loaded on to another ship, or back onto the same ship or loaded instead onto another form of transport such as a road vehicle or train.

Traditionally, the container cranes have been controlled in an operator cabin mounted on the container crane. Recently however, container cranes have become remote controlled and even fully automated. This reduces or eliminates the need for crane operators being exposed to inconvenience, danger and even injury of being located on a container crane.

However, with ever increasing sizes of container cranes, accurate positioning of containers and targets becomes increasingly difficult. When fully automated systems are being deployed for landing or picking up containers e.g. in relation to vehicle chassis, it is of utmost importance that positioning of load and target is accurate, as any mistake can lead to a container damaging the vehicle or even drivers in the driver cabin.

SUMMARY

One objective is to improve accuracy in positioning a target for landing or picking up a container.

According to a first aspect, it is provided a sensor trolley for use in a container crane. The sensor trolley comprises: a sensor arrangement being usable to determine a position of a target for landing or picking up a container; and wherein the sensor trolley is configured to be movable along a horizontal trolley support of the container crane for the sensor arrangement to cover a plurality of vehicle lanes under the container crane.

The sensor arrangement may comprise a LIDAR, Light Detection and Ranging, system.

The LIDAR system may comprise two LIDARs arranged cross-wise.

The sensor arrangement may comprise a camera for identifying vehicles and/or containers.

The sensor trolley may further comprise a visual indicator for providing indications to vehicles in the vehicle lanes.

The indications may comprise an indication to what vehicle lane to use.

The indications may comprise an indicator when it is safe for the vehicle to drive to a position for landing or picking up a container.

The sensor trolley may further comprise an optical reference marker. The optical reference marker may comprise an active light source.

According to a second aspect, it is provided a container crane comprising: a spreader configured to controllably attach to a container; a container trolley to which the spreader is attached via cables, the container trolley being provided on an upper part of the container crane and being horizontally moveable along a first direction; two horizontal trolley supports provided along the first direction between vertical structures of the container crane; the sensor trolley according to the first aspect, provided such that it is movable along one of the horizontal trolley supports.

The container crane may comprise two sensor trolleys according to the first aspect, respectively provided such that they are movable along the two horizontal trolley supports.

The horizontal support may be crossbeams.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
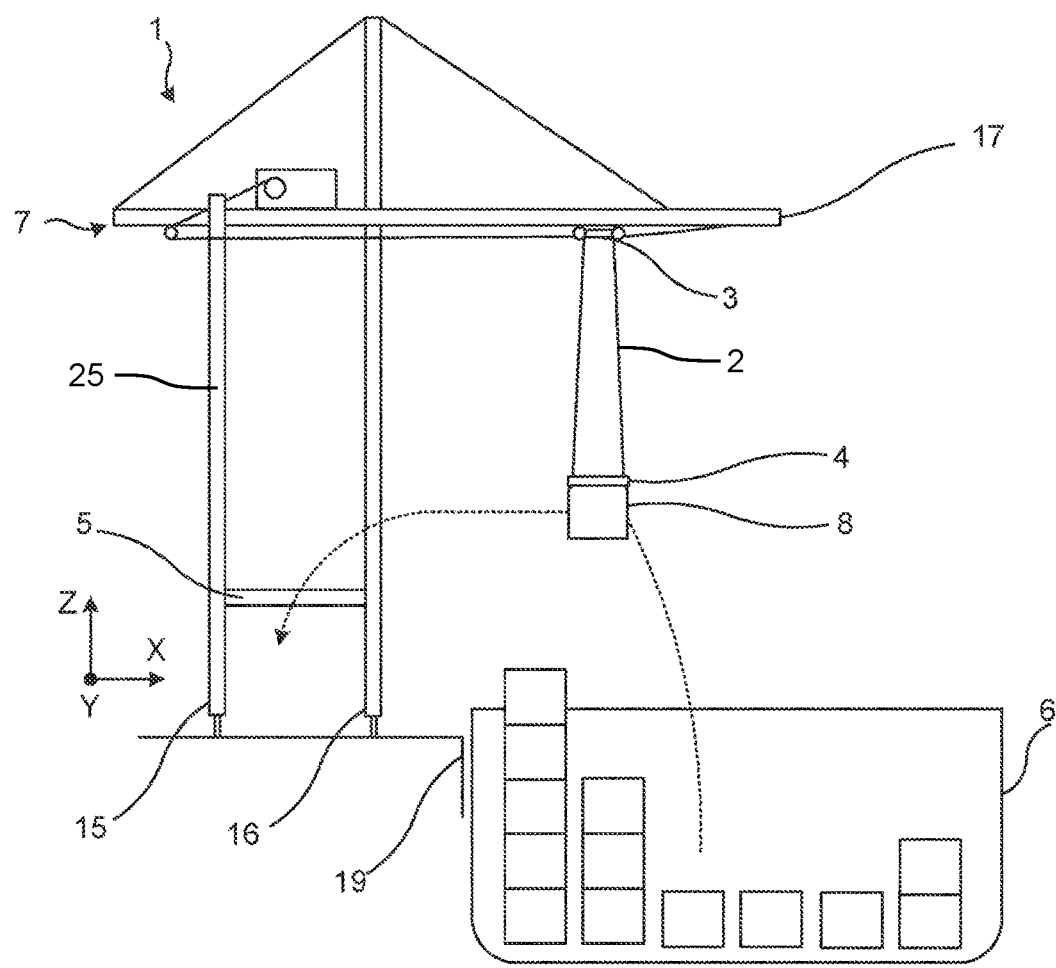
FIG. 1 is a schematic diagram illustrating an environment in which embodiments presented herein can be applied.

FIG. 1 is a schematic diagram illustrating an environment in which embodiments presented herein can be applied. It is here shown a ship 6 comprising a number of containers and a container crane 1. The container crane 1 can thus be a ship to shore crane. The container crane 1 is shown to have a boom 17 at the upper part 7 of the container.

A spreader 4 is configured to controllably attach to a container 8. The spreader 4 is attached to a container trolley 3 via cables 2. The container trolley 3 is provided on an upper part of the container crane 1, such as the boom 17, and is horizontally (and linearly) moveable along a first direction, which is the X direction in the coordinate system indicated in the Figures. This first direction is also known as gantry direction.

Hence, the boom 17 supports a container trolley 3 such that it can move back and forth in the first direction. It is to be noted that the container crane 1 can be provided with multiple spreaders for simultaneous movement of multiple containers.

The container crane 1 lifts the container 8, for example, out of the ship 6 and along a path, to land the container 8 on target which can be a truck or other vehicle (not shown), another container, or a landing place such as a ground slot. The container crane 1 runs on rails under each set 15, 16 of legs in a direction in or out of the plane of the paper, indicated as a Y direction. The quay 19 is also shown.

A lower crossbeam 5 is provided to provide stability to the structure of the container crane 1. In fact, there are two lower crossbeams in the first (X) direction, as is seen better in FIG. 2. Each crossbeam 5 is provided essentially horizontally between vertical structures 25 of the container crane 1, more specifically between a back leg 15 and a front leg 16. The container crane also comprises two upper crossbeams 9, each provided horizontally between a front leg and a back leg. Each crossbeam 5 can be an embodiment of a horizontal trolley support, for supporting a sensor trolley, described in more detail below. Alternatively, the sensor trolley is supported by a wire between the vertical structures 25 of the container crane. The wire can be essentially horizontal.

The container crane is very high. The distance from the quay 19 to the boom 17 can be greater than 50 metres and can even be 60 metres or more. The horizontal trolley support (e.g. the lower crossbeam or the wire) may preferably be located 10-15 metres above the quay 19.

Figure 2:
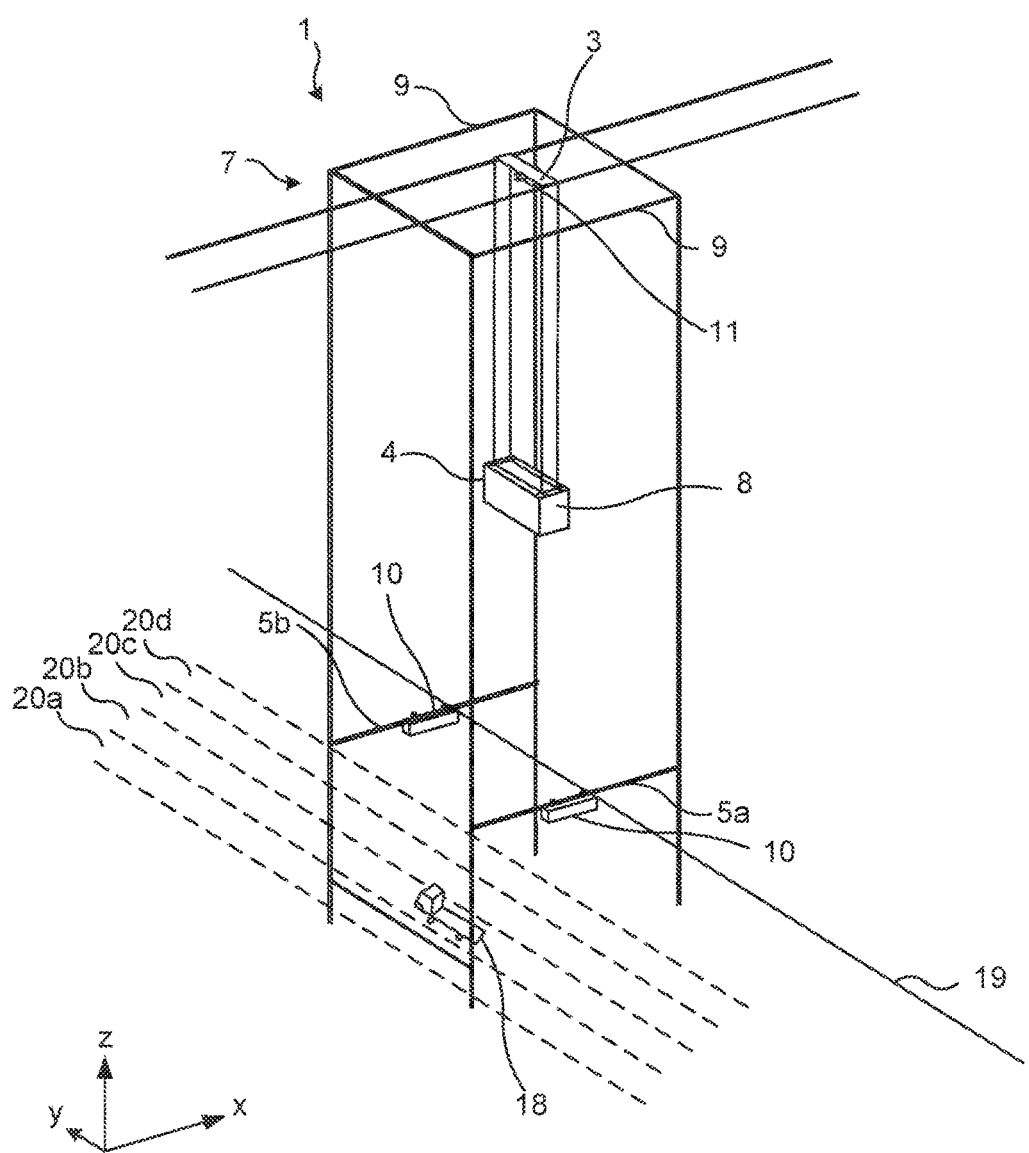
FIG. 2 is a perspective view of an embodiment of the container crane of FIG. 1 showing a sensor trolley.

FIG. 2 is a perspective view of an embodiment of the container crane of FIG. 1 showing a sensor trolley 10. Neither the parts above the container trolley 3 nor the full extent of the boom are shown here, for reasons of clarity. Here, the distinction between the two crossbeams 5a-b is clearly shown.

Under the container crane 1, there are here four vehicle lanes 20a-d, where vehicles can pass and stop. When a vehicle is stationary, the container crane 1 can be used to land a container on the vehicle or to pick up a container from the vehicle. It is to be noted that while four vehicle lanes 20a-d are shown here, any suitable number of vehicle lanes can be provided.

A load positioning system 11 is provided on the container trolley 3. The load positioning system 11 is used to determine a current position of the load, i.e. the container 8. The load positioning system 11 can be based on a camera, such as a CCD (Charge-coupled device).

In the example illustrated in FIG. 2, the container 8 is to be landed on a target 18, in this case on a chassis of a vehicle. The target 18 is here in the second vehicle lane 20b.

In order to provide accurate positioning of the target 18 for landing or picking up a container, a sensor trolley 10 is provided. In this example, two sensor trolleys 10 are provided. Each sensor trolley 10 is configured to be movable along one of the horizontal trolley support, here embodied as the (lower) cross beams 5a-b of the container crane 1. In this way, a sensor arrangement of the container crane covers a plurality of the vehicle lanes 20a-f under the container crane 1. Each sensor trolley is provided vertically lower, i.e. closer to ground, than the container trolley. The sensor trolley(s) may be provided at a height which is 20-30% of the height of the container trolley.

Two sensor trolleys 10 provide greater accuracy of positioning the target 18. Also, two sensor trolleys 10 allow skew between the container crane and vehicle to be identified and corrected for. Furthermore, the use of two sensor trolleys 10 reduces or even eliminates the risk that a driver cabin of a vehicle blocks the chassis (i.e. target). Two sensor trolleys 10 enables traffic to flow both ways under the container crane 1. Nevertheless, in some situations, the accuracy provided by one sensor trolley 10 is sufficient, thus saving cost.

Since the sensor trolleys 10 are provided on the lower cross beams 5a-b and are movable along the first direction, maintenance is simplified. For maintenance, the sensor trolley 10 can be positioned in an end position and a ladder can be used for maintenance personnel to easily reach the sensor trolley from ground. The ladder can be used since the lower cross beam 5a-b is at a height where a sky lift is not necessary.

Figure 3:
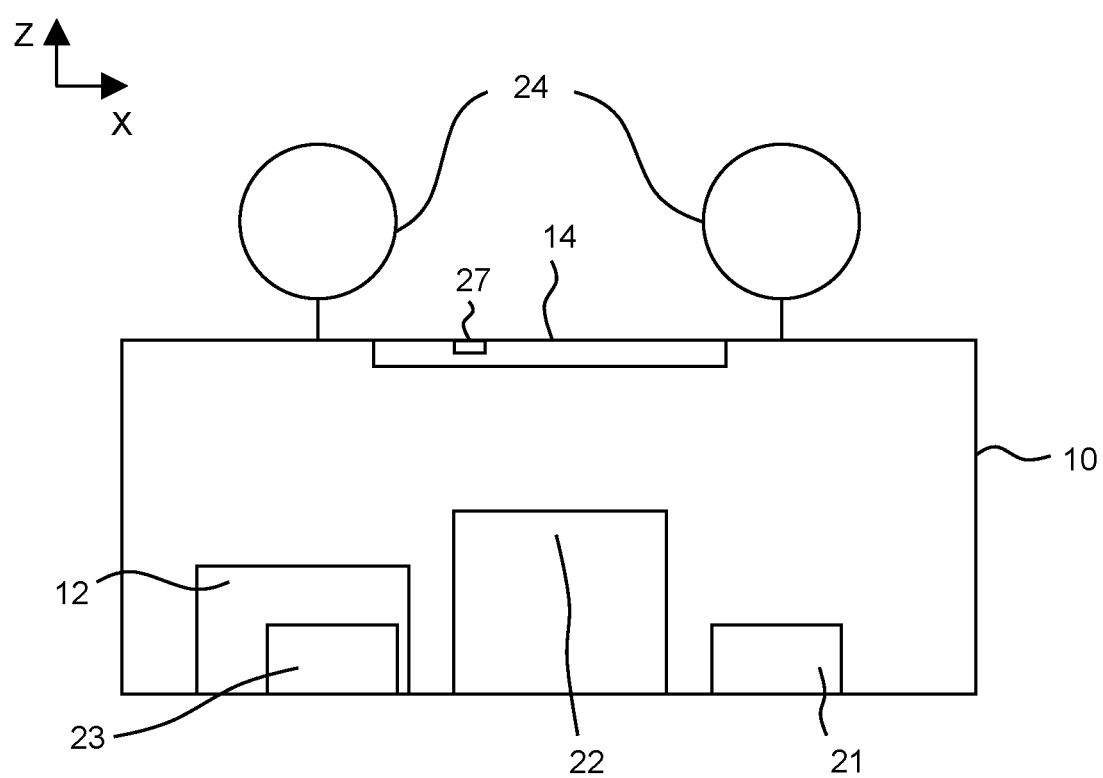
FIG. 3 is a schematic diagram of the sensor trolley of FIG. 2.

FIG. 3 is a schematic diagram of the sensor trolley 10 of FIG. 2. The sensor trolley 10 comprises wheels 24 or other linear movement guide to allow the sensor trolley 10 to move linearly along the horizontal trolley support, e.g. crossbeam or wire. The sensor trolley 10 comprises a sensor arrangement 12 being usable to determine a position of a target 18 for landing or picking up a container 8.

Figure 4:
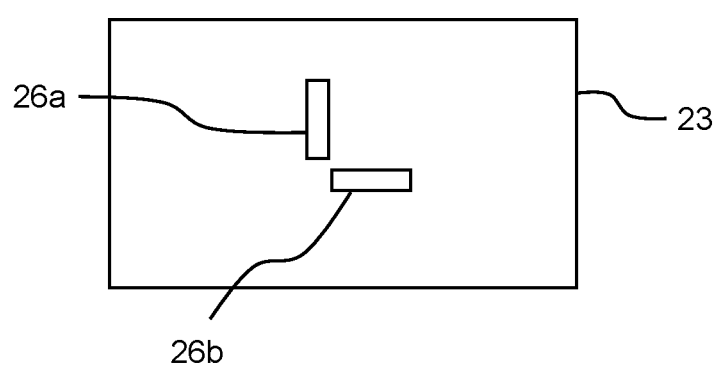
FIG. 4 is a schematic diagram of a LIDAR (Light Detection and Ranging) system arranged in the sensor trolley of FIG. 2.

The sensor arrangement 12 can comprise a LIDAR (Light Detection and Ranging) system 23 to generate a three dimensional (3D) representation containing the target 18. The LIDAR system 23 can comprises two LIDARs 26a-b arranged cross-wise, i.e. essentially perpendicular (FIG. 4). Alternatively or additionally, the sensor arrangement 12 is based on a two-dimensional (2D) laser, radar or image processing.

The sensor arrangement 12 can also comprise a camera 21 for identifying vehicles and/or containers. The camera 21 can e.g. be a pan-tilt-zoom (PTZ) camera. The vehicles may have visual markers to allow identification with the camera 21. This allows a current vehicle to be identified, as well as any vehicles waiting in line. The containers can be identified e.g. by capturing an image of a container identifier (such as a container number) on the short end of the container. Also, placards (such as for dangerous goods) and door direction of containers can be identified and recorded. Images of the container can be stored for later verification in terms of damage management.

Optionally, the sensor trolley 10 is provided with a reference marker 14 to allow the load positioning system 11 to determine the position of the sensor trolley 10 relative to the load positioning system 11. The reference marker 14 can be an optical and/or structural marker which is clearly identifiable by the load positioning system 11. When the reference marker 14 is an optical reference marker, this can comprise an active light source 27. In which case, this can be configured to provide a distinguishable light pattern by controlling when the light source is on or off, e.g. blinking pattern.

Optionally, the sensor trolley 10 comprises a visual indicator 22 for providing indications to vehicles 18 in the vehicle lanes 20a-f. The indications can e.g. comprise an indication to what vehicle lane to use, in the form of a symbol (e.g. an arrow) and/or text. The indications can comprise an indicator when it is safe for the vehicle to drive to a position for landing or picking up a container. The indications can also include a vehicle identifier, whereby a driver of a particular vehicle can be directed using the indications. For instance "Vehicle X should enter lane Y".

The visual indicator 22 is thus a tool which is very helpful in guiding drivers of vehicles where to go, when to stop and when to drive away.

The sensor trolley keeps track of the position, movement and orientation of the vehicles in the area under the container crane. The driver can in this way safely remain in the vehicle when the load is automatically landed on the chassis. The sensor trolley can also register the next vehicle in line.

Optionally, if the sensor trolley detects that the vehicle is moving when the container is about to be landed or picked up, a signal is generated which causes the container crane to stop movement, or alternatively quickly hoist the spreader (which may carry a container) up again, to prevent damage to equipment or people.

Using the sensor trolley described herein, accurate positioning of the target is provided. By allowing the sensor trolley to move across vehicle lanes, the sensor trolley is not blocked by other vehicles.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A sensor trolley for use in a container crane, the sensor trolley comprising:
   a sensor arrangement being usable to determine a position of a target for landing or picking up a container; and
   wherein the sensor trolley is configured to be movable along a horizontal trolley support of the container crane for the sensor arrangement to cover a plurality of vehicle lanes under the container crane;
   wherein the sensor trolley further comprises a visual indicator for providing indications to vehicles in the vehicle lanes;
   wherein the indications comprise an indication to what vehicle lane to use.

2. The sensor trolley according to claim 1, wherein the sensor arrangement comprises a LIDAR, Light Detection and Ranging, system.

3. The sensor trolley according to claim 2, wherein the LIDAR system comprises two LIDARs arranged cross-wise.

4. The sensor trolley according to claim 3, wherein the sensor arrangement comprises a camera for identifying vehicles and/or containers.

5. The sensor trolley according to claim 4, wherein the indications comprise an indication to one of the vehicles that said one vehicle can drive to a position for landing or picking up a container.

6. The sensor trolley according to claim 5, further comprising an optical reference marker.

7. The sensor trolley according to claim 6, wherein the optical reference marker comprises an active light source.

8. The sensor trolley according to claim 1, wherein the sensor arrangement comprises a camera for identifying vehicles and/or containers.

9. The sensor trolley according to claim 1, wherein the indications comprise an indication to one of the vehicles that said one vehicle can drive to a position for landing or picking up a container.

10. The sensor trolley according to claim 1, further comprising an optical reference marker.

11. The sensor trolley according to claim 10, wherein the optical reference marker comprises an active light source.

12. A container crane comprising:
    a spreader configured to controllably attach to a container;
    a container trolley to which the spreader is attached via cables, the container trolley being provided on an upper part of the container crane and being horizontally moveable along a first direction;
    two horizontal trolley supports provided along the first direction between vertical structures of the container crane; and
    a sensor trolley having a sensor arrangement that is usable to determine a position of a target for landing or picking up a container, the sensor trolley being configured to be movable along one of the horizontal trolley supports for the sensor arrangement to cover a plurality of vehicle lanes under the container crane, wherein the sensor trolley has a visual indicator for providing indications to vehicles in the vehicle lanes, wherein the sensor trolley is provided vertically lower than the container trolley;
    wherein the indications comprise an indication to what vehicle lane to use.

13. The container crane according to claim 12, comprising two sensor trolleys, respectively provided such that the sensor trolleys are movable along the two horizontal trolley supports.

14. The container crane according to claim 12, wherein the horizontal supports are crossbeams.

15. The container crane according to claim 12, wherein the sensor arrangement comprises a camera for identifying vehicles and/or containers.

16. The container crane according to claim 12, wherein the sensor arrangement comprises a LIDAR, Light Detection and Ranging, system.

17. The container crane according to claim 16, wherein the LIDAR system comprises two LIDARs arranged cross-wise.

18. The container crane according to claim 12, wherein the sensor trolley further comprises an optical reference marker.

19. The container crane according to claim 18, wherein the optical reference marker comprises an active light source.

* * * * *